US012123076B2

(12) United States Patent
Rame et al.

(10) Patent No.: US 12,123,076 B2
(45) Date of Patent: Oct. 22, 2024

(54) LOW DENSITY NICKEL-BASED SUPERALLOY HAVING HIGH MECHANICAL STRENGTH AND ENVIRONMENTAL ROBUSTNESS AT A HIGH TEMPERATURES

(71) Applicants: SAFRAN, Paris (FR); UNIVERSITE DE NANTES, Nantes (FR); CENTRE NATIONAL DE LA RECHERCHE SCIENTIFIQUE, Paris (FR)

(72) Inventors: Jérémy Rame, Moissy-Cramayel (FR); Edern Menou, Moissy-Cramayel (FR); Clara Desgranges, Moissy-Cramayel (FR); Franck Tancret, Nantes (FR)

(73) Assignees: SAFRAN, Paris (FR); UNIVERSITE DE NANTES, Nantes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 52 days.

(21) Appl. No.: 17/421,554

(22) PCT Filed: Jan. 14, 2020

(86) PCT No.: PCT/FR2020/050048
§ 371 (c)(1),
(2) Date: Jul. 8, 2021

(87) PCT Pub. No.: WO2020/148503
PCT Pub. Date: Jul. 23, 2020

(65) Prior Publication Data

US 2022/0081739 A1 Mar. 17, 2022

(30) Foreign Application Priority Data

Jan. 16, 2019 (FR) ....................................... 1900389

(51) Int. Cl.
*C22C 19/05* (2006.01)
*F01D 5/28* (2006.01)

(52) U.S. Cl.
CPC .............. *C22C 19/057* (2013.01); *F01D 5/28* (2013.01); *F05D 2300/175* (2013.01); *F05D 2300/607* (2013.01)

(58) Field of Classification Search
CPC ................................. C22C 19/057; C22F 1/10
See application file for complete search history.

(56) References Cited

U.S. PATENT DOCUMENTS

| | | | | |
|---|---|---|---|---|
| 4,626,297 | A | 12/1986 | Meetham et al. | |
| 2011/0076180 | A1 | 3/2011 | Suzuki et al. | |
| 2015/0284824 | A1* | 10/2015 | Goehler | F01D 5/28 420/588 |
| 2016/0184888 | A1 | 6/2016 | Peck et al. | |
| 2016/0348216 | A1 | 12/2016 | Szuromi et al. | |
| 2018/0179622 | A1 | 6/2018 | Taneike et al. | |

FOREIGN PATENT DOCUMENTS

| | | | | |
|---|---|---|---|---|
| EP | 2 006 402 | A2 | 12/2008 | |
| WO | WO-2008111585 | A1 * | 9/2008 | C22C 19/05 |
| WO | WO 2018/078269 | A1 | 5/2018 | |
| WO | WO 2018/157228 | A1 | 9/2018 | |

OTHER PUBLICATIONS

English Abstract and English Machine Translation of Sato et al. (WO 2008/111585) (Sep. 18, 2008).*
First Office Action as issued in Chinese Patent Application No. 202080009467.6, dated Mar. 17, 2022.
International Search Report as issued in International Patent Application No. PCT/FR2020/050048, dated Apr. 24, 2020.

* cited by examiner

*Primary Examiner* — Jessee R Roe
(74) *Attorney, Agent, or Firm* — Pillsbury Winthrop Shaw Pittman LLP

(57) ABSTRACT

A nickel-based superalloy includes, in weight percent, 6 to 8% aluminum, 12 to 15% cobalt, 4 to 8% chromium, 0 to 0.2% hafnium, 0.5 to 4% molybdenum, 3.5 to 6% rhenium, 4 to 6% tantalum, 1 to 3% titanium, 0 to 2% tungsten, 0 to 0.1% silicon, the balance being nickel and unavoidable impurities.

14 Claims, No Drawings

LOW DENSITY NICKEL-BASED SUPERALLOY HAVING HIGH MECHANICAL STRENGTH AND ENVIRONMENTAL ROBUSTNESS AT A HIGH TEMPERATURES

CROSS-REFERENCE TO RELATED APPLICATIONS

This application is the U.S. National Stage of PCT/FR2020/050048, filed Jan. 14, 2020, which in turn claims priority to French patent application number 1900389 filed Jan. 16, 2019. The content of these applications are incorporated herein by reference in their entireties.

TECHNICAL FIELD

The present invention relates to the general field of nickel-based superalloys for turbomachinery, in particular for vanes, also called distributors or rectifiers, or blades, or ring segments.

PRIOR ART

Nickel-based superalloys are generally used for the hot parts of turbomachinery, i.e., the parts of turbomachinery downstream of the combustion chamber.

The main advantages of nickel-based superalloys are that they combine both high creep resistance at temperatures comprised between 650° C. and 1200° C. and resistance to oxidation and corrosion.

The high-temperature performance is mainly due to the microstructure of these materials, which is composed of a γ-Ni matrix of face-centered cubic (FCC) crystal structure and ordered γ'-$Ni_3Al$ hardening precipitates of $L1_2$ structure.

Some grades of nickel-based superalloys are used for the manufacture of single-crystal parts.

DISCLOSURE OF THE INVENTION

The aim of the present invention to provide nickel-based superalloy compositions that provide improved mechanical strength, and in particular creep resistance.

Another aim of the present invention is to provide superalloy compositions that provide improved environmental resistance, particularly corrosion resistance and oxidation resistance.

Another aim of the present invention is to provide superalloy compositions that have a reduced density.

According to a first aspect, the invention provides a nickel-based superalloy comprising, in weight percent, 6 to 8% aluminum, 12 to 15% cobalt, 4 to 8% chromium, 0 to 0.2% hafnium, 0.5 to 4% molybdenum, 3.5 to 6% rhenium, 4 to 6% tantalum, 1 to 3% titanium, 0 to 2% tungsten, 0 to 0.1% silicon, the balance consisting of nickel and unavoidable impurities.

A nickel-based alloy is defined as an alloy with a majority of nickel by weight.

Unavoidable impurities are defined as elements not intentionally added to the composition but contributed with other elements. Among unavoidable impurities, particular mention may be made of carbon (C) or sulfur (S).

The nickel-based superalloy in accordance with the invention has good microstructural stability at temperature, thus enabling high mechanical properties to be obtained at temperature.

The nickel-based superalloy in accordance with the invention has improved corrosion resistance and oxidation resistance.

The nickel-based superalloy in accordance with the invention reduces the susceptibility to casting defect formation.

The nickel-based superalloy in accordance with the invention provides a density of less than 8.4 $g \cdot cm^{-3}$.

In a possible alternative, the superalloy may comprise, in weight percent, 6 to 8% aluminum, 12 to 15% cobalt, 4 to 8% chromium, 0 to 0.2% hafnium, 0.5 to 4% molybdenum, 3.5 to 6% rhenium, 4 to 6% tantalum, 1 to 3% titanium, 0 to 2% tungsten, 0 to 0.05% silicon, the balance consisting of nickel and unavoidable impurities.

Furthermore, the superalloy may comprise, in weight percent, 6 to 8% aluminum, 12 to 15% cobalt, 4 to 8% chromium, 0 to 0.15% hafnium, 0.5 to 4% molybdenum, 3.5 to 6% rhenium, 4 to 6% tantalum, 1 to 3% titanium, 0 to 2% tungsten, 0 to 0.1% silicon, the balance consisting of nickel and unavoidable impurities.

According to a possible alternative, the superalloy may comprise, in weight percent, 6.5 to 7.5% aluminum, 12 to 15% cobalt, 4.5 to 7.5% chromium, 0 to 0.2% hafnium, 0.5 to 3.5% molybdenum 3.5 to 5.5% rhenium, 4.5 to 5.5% tantalum, 1.5 to 2.5% titanium, 0 to 1.5% tungsten, 0 to 0.1% silicon, the balance consisting of nickel and unavoidable impurities.

According to a possible alternative, the superalloy may also comprise, in weight percent, 6.5 to 7.5% aluminum, 13 to 15% cobalt, 4.5 to 5.5% chromium, 0 to 0.2% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

According to a possible alternative, the superalloy may comprise, in weight percent, 6.5 to 7.5% aluminum, 13 to 15% cobalt, 4.5 to 5.5% chromium, 0 to 0.15% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

According to a possible alternative, the superalloy may comprise, in weight percent, 6.5 to 7.5% aluminum, 13 to 15% cobalt, 4.5 to 5.5% chromium, 0 to 0.1% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

According to a possible alternative, the superalloy may comprise, in weight percent, 6.5 to 7.5% aluminum, 13 to 15% cobalt, 4.5 to 5.5% chromium, 1.5 to 2.5% molybdenum, 4.5 to 5.5% rhenium, 4.5 to 5.5% tantalum, 1.5 to 2.5% titanium, 0.5 to 1.5% tungsten, 0 to 0.1% silicon, the balance consisting of nickel and unavoidable impurities.

According to a possible alternative, the superalloy may comprise, in weight percent, 6.5 to 7.5% aluminum, 13 to 15% cobalt, 4.5 to 5.5% chromium, 0 to 0.1% hafnium, 1.5 to 2.5% molybdenum 4.5 to 5.5% rhenium, 4.5 to 5.5% tantalum, 1.5 to 2.5% titanium, 0.5 to 1.5% tungsten, 0 to 0.1% silicon, the balance consisting of nickel and unavoidable impurities.

The superalloy may further comprise, in weight percent, 6.5 to 7.5% aluminum, 13 to 15% cobalt, 4.5 to 5.5% chromium, 0 to 0.2% hafnium, 0.5 to 1.5% molybdenum, 4.5 to 5.5% rhenium, 4.5 to 5.5% tantalum, 1.5 to 2.5% titanium, the balance consisting of nickel and unavoidable impurities.

According to a possible alternative, the superalloy may comprise, in weight percent, 6.5 to 7.5% aluminum, 12 to 14% cobalt, 5.5 to 6.5% chromium, 0 to 0.2% hafnium, 1.5 to 2.5% molybdenum, 4.5 to 5.5% rhenium, 4.5 to 5.5% tantalum, 1.5 to 2.5% titanium, the balance consisting of nickel and unavoidable impurities.

According to another possible alternative, the superalloy may comprise, in weight percent, 6.5 to 7.5% aluminum, 13 to 15% cobalt, 5.5 to 6.5% chromium, 0 to 0.2% hafnium, 1.5 to 2.5% molybdenum, 4.5 to 5.5% rhenium, 4.5 to 5.5% tantalum, 1.5 to 2.5% titanium, the balance consisting of nickel and unavoidable impurities.

According to another possible alternative, the superalloy may comprise, in weight percent: 6.5 to 7.5% aluminum, 12 to 14% cobalt, 6.5 to 7.5% chromium, 0 to 0.2% hafnium, 0.5 to 1.5% molybdenum, 4.5 to 5.5% rhenium, 4.5 to 5.5% tantalum, 1.5 to 2.5% titanium, the balance consisting of nickel and unavoidable impurities According to another possible alternative, the superalloy may comprise, in weight percent: 6.5 to 7.5% aluminum, 13 to 15% cobalt, 6.5 to 7.5% chromium, 0 to 0.2% hafnium, 1.5 to 2.5% molybdenum, 3.5 to 4.5% rhenium, 4.5 to 5.5% tantalum, 1.5 to 2.5% titanium, with the remainder consisting of nickel and unavoidable impurities According to a possible alternative, the superalloy may comprise, in weight percent: 6.5 to 7.5% aluminum, 13 to 15% cobalt, 5.5 to 6.5% chromium, 0 to 0.2% hafnium, 2.5 to 3.5% molybdenum, 3.5 to 4.5% rhenium, 4.5 to 5.5% tantalum, 1.5 to 2.5% titanium, the balance consisting of nickel and unavoidable impurities According to a second aspect, the invention provides a nickel-based superalloy turbomachinery part according to any of the preceding features.

The part can be an element of an aircraft turbomachinery turbine, for example a high-pressure turbine or a low-pressure turbine, or a compressor element, and in particular a high-pressure compressor.

According to an additional feature, the turbine or compressor part can be a blade, said blade can be a moving blade or a vane, or a ring sector.

According to another feature, the turbomachinery part is single-crystal, preferably with a crystal structure oriented along a crystallographic direction <001>.

According to a third aspect, the invention provides a process for manufacturing a nickel-based superalloy turbomachinery part according to any one of the preceding features by casting.

According to an additional feature, the process comprises a directional solidification step to form a single-crystal part.

DESCRIPTION OF THE EMBODIMENTS

The superalloy in accordance with the invention comprises a nickel base with associated major additive elements.

Major additive elements comprise: cobalt Co, chromium Cr, molybdenum Mo, tungsten W, aluminum Al, tantalum Ta, titanium Ti, and rhenium Re.

The superalloy may also comprise minor additive elements, which are additive elements whose maximum percentage in the superalloy does not exceed 1% by weight.

Minor additive elements comprise: hafnium Hf and silicon Si.

The nickel-based superalloy comprises, in weight percent, 6 to 8% aluminum, 12 to 15% cobalt, 4 to 8% chromium, 0 to 0.2% hafnium, 0.5 to 4% molybdenum, 3 to 6% rhenium, 4 to 6% tantalum, 1 to 3% titanium, 0 to 2% tungsten, 0 to 0.1% silicon, the balance consisting of nickel and unavoidable impurities.

The nickel-based superalloy may also advantageously comprise, in weight percent, 6 to 8% aluminum, 12 to 15% cobalt, 4 to 8% chromium, 0 to 0.2% hafnium, 0.5 to 4% molybdenum, 3 to 6% rhenium, 4 to 6% tantalum, 1 to 3% titanium, 0 to 2% tungsten, 0 to 0.05% silicon, the balance consisting of nickel and unavoidable impurities.

The nickel-based superalloy may also advantageously comprise, in weight percent, 6 to 8% aluminum, 12 to 15% cobalt, 4 to 8% chromium, 0 to 0.1% hafnium, 0.5 to 4% molybdenum, 3 to 6% rhenium, 4 to 6% tantalum, 1 to 3% titanium, 0 to 2% tungsten, 0 to 0.1% silicon, the balance consisting of nickel and unavoidable impurities.

The nickel-based superalloy may also advantageously comprise, in weight percent, 6 to 8% aluminum, 12 to 15% cobalt, 4 to 8% chromium, 0 to 0.05% hafnium, 0.5 to 4% molybdenum, 3 to 6% rhenium, 4 to 6% tantalum, 1 to 3% titanium, 0 to 2% tungsten, 0 to 0.1% silicon, the balance consisting of nickel and unavoidable impurities.

The nickel-based superalloy may also advantageously comprise, in weight percent, 6 to 8% aluminum, 12 to 15% cobalt, 4 to 8% chromium, 0 to 0.1% hafnium (preferably 0 to 0.05% hafnium), 0.5 to 4% molybdenum, 3 to 6% rhenium, 4 to 6% tantalum, 1 to 3% titanium, 0 to 2% tungsten, 0 to 0.05% silicon, the balance consisting of nickel and unavoidable impurities.

The superalloy may also advantageously comprise, in weight percent, 6.5 to 7.5% aluminum, 12 to 15% cobalt, 4.5 to 7.5% chromium, 0 to 0.2% hafnium, 0.5 to 3.5% molybdenum, 3.5 to 5.5% rhenium, 4.5 to 5.5% tantalum, 1.5 to 2.5% titanium, 0 to 1.5% tungsten, 0 to 0.1% silicon, the balance consisting of nickel and unavoidable impurities.

The superalloy may advantageously comprise, in weight percent, 6.5 to 7.5% aluminum, 12 to 15% cobalt, 4.5 to 7.5% chromium, 0 to 0.2% hafnium, 0.5 to 3.5% molybdenum 3.5 to 5.5% rhenium, 4.5 to 5.5% tantalum, 1.5 to 2.5% titanium, 0 to 1.5% tungsten, 0 to 0.05% silicon, the balance consisting of nickel and unavoidable impurities.

The superalloy may also advantageously comprise, in weight percent, 6.5 to 7.5% aluminum, 12 to 15% cobalt, 4.5 to 7.5% chromium, 0 to 0.1% hafnium, 0.5 to 3.5% molybdenum, 3.5 to 5.5% rhenium, 4.5 to 5.5% tantalum, 1.5 to 2.5% titanium, 0 to 1.5% tungsten, 0 to 0.1% silicon, the balance consisting of nickel and unavoidable impurities.

Preferentially, the superalloy may comprise, in weight percent, 6.5 to 7.5% aluminum, 12 to 15% cobalt, 4.5 to 7.5% chromium, 0 to 0.05% hafnium, 0.5 to 3.5% molybdenum 3.5 to 5.5% rhenium, 4.5 to 5.5% tantalum, 1.5 to 2.5% titanium, 0 to 1.5% tungsten, 0 to 0.1% silicon, the balance consisting of nickel and unavoidable impurities.

Preferentially, the superalloy may comprise, in weight percent, 6.5 to 7.5% aluminum, 12 to 15% cobalt, 4.5 to 7.5% chromium, 0 to 0.1% hafnium (preferably 0 to 0.05% hafnium), 0.5 to 3.5% molybdenum, 3.5 to 5.5% rhenium, 4.5 to 5.5% tantalum, 1.5 to 2.5% titanium, 0 to 1.5% tungsten, 0 to 0.05% silicon, the balance consisting of nickel and unavoidable impurities.

The superalloy may also comprise, in weight percent, 6.5 to 7.5% aluminum, 13 to 15% cobalt, 4.5 to 5.5% chromium, 0 to 0.2% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

The superalloy may also comprise, in weight percent, 6.5 to 7.5% aluminum, 13 to 15% cobalt, 4.5 to 5.5% chromium, 0 to 0.15% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

The superalloy may also comprise, in weight percent, 6.5 to 7.5% aluminum, 13 to 15% cobalt, 4.5 to 5.5% chromium, 0 to 0.1% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

The superalloy may also comprise, in weight percent, 6.5 to 7.5% aluminum, 13 to 15% cobalt, 4.5 to 5.5% chromium, 1.5 to 2.5% molybdenum, 4.5 to 5.5% rhenium, 4.5 to 5.5% tantalum, 1.5 to 2.5% titanium, 0.5 to 1.5% tungsten, 0 to 0.1% silicon, the balance consisting of nickel and unavoidable impurities.

The superalloy may also comprise, in weight percent, 6.5 to 7.5% aluminum, 13 to 15% cobalt, 4.5 to 5.5% chromium, 0 to 0.1% hafnium, 1.5 to 2.5% molybdenum, 4.5 to 5.5% rhenium, 4.5 to 5.5% tantalum, 1.5 to 2.5% titanium, 0.5 to 1.5% tungsten, 0 to 0.1% silicon, the balance consisting of nickel and unavoidable impurities.

The superalloy may also comprise, in weight percent, 6.5 to 7.5% aluminum, 13 to 15% cobalt, 4.5 to 5.5% chromium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

The superalloy may also comprise, in weight percent, 6.5 to 7.5% aluminum, 13 to 15% cobalt, 4.5 to 5.5% chromium, 0 to 0.2% hafnium, 0.5 to 1.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 4.5 to 5.5% chromium, 0.5 to 1.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 12 to 14% cobalt, 5.5 to 6.5% chromium, 0 to 0.2% hafnium, 1.5 to 2.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 12 to 14% cobalt, 5.5 to 6.5% chromium, 1.5 to 2.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 5.5 to 6.5% chromium, 0 to 0.2% hafnium, 1.5 to 2.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 5.5 to 6.5% chromium, 1.5 to 2.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 12 to 14% cobalt, 6.5 to 7.5% chromium, 0 to 0.2% hafnium, 0.5 to 1.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 12 to 14% cobalt, 6.5 to 7.5% chromium, 0.5 to 1.5% molybdenum, 4.5 to 5.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 6.5 to 7.5% chromium, 0 to 0.2% hafnium, 1.5 to 2.5% molybdenum, 3.5 to 4.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 6.5 to 7.5% chromium, 1.5 to 2.5% molybdenum, 3.5 to 4.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 5.5 to 6.5% chromium, 0 to 0.2% hafnium, 2.5 to 3.5% molybdenum, 3.5 to 4.5% rhenium, 4.5 to 5.5% tantalum, 1.5 to 2.5% titanium, the balance consisting of nickel and unavoidable impurities.

The superalloy may also comprise, in weight percent, 6.5 to 7.5% aluminum, 13 to 15% cobalt, 5.5 to 6.5% chromium, 2.5 to 3.5% molybdenum, 3.5 to 4.5% rhenium, 4.5 to 5.5% tantalum, 1.5 to 2.5% titanium, the balance consisting of nickel and unavoidable impurities.

Cobalt, chromium, tungsten, molybdenum and rhenium are mainly involved in the hardening of the $\gamma$ phase, the austenitic matrix of FCC structure.

Aluminum, titanium, and tantalum promote the precipitation of the $\gamma'$ phase, the hardening $Ni_3$ (Al, Ti, Ta) phase with an $L1_2$ ordered cubic structure.

Furthermore, rhenium slows down the diffusive processes and limits the coalescence of the $\gamma'$ phase, thus improving the creep resistance at high temperature. However, the rhenium content should not be too high in order not to negatively impact the mechanical properties of the superalloy part.

The refractory elements, namely molybdenum, tungsten, rhenium and tantalum, also slow down the diffusion-controlled mechanisms, thus improving the creep resistance of the superalloy part.

Furthermore, chromium and aluminum improve resistance to oxidation and corrosion at high temperatures, in particular around 900° C. for corrosion and around 1100° C. for oxidation.

The addition of silicon and hafnium also optimizes the hot oxidation resistance of the superalloy by increasing the adhesion of the $Al_2O_3$ alumina layer that forms on the surface of the superalloy at high temperature in an oxidizing environment.

Furthermore, chromium and cobalt help to decrease the solvus temperature $\gamma'$ of the superalloy.

Cobalt is an element chemically related to nickel that partially substitutes for nickel to form a solid solution in the $\gamma$ phase, thereby strengthening the $\gamma$ matrix, reducing the susceptibility to precipitation of topologically compact phases, in particular the $\mu$, P, R, and $\sigma$ phases, and Laves phases, and reducing the susceptibility to secondary reaction zone (SRZ) formation.

Such a superalloy composition improves the mechanical properties at high temperature (650° C.-1200° C.) of the parts manufactured from said superalloy.

In particular, such a superalloy composition makes it possible to obtain a minimum fracture stress of 250 MPa at 950° C. for 1100 h, as well as a minimum fracture stress of 150 MPa at 1050° C. for 550 h, and a minimum fracture stress of 55 MPa at 1200° C. for 510 h.

Such mechanical properties are due in particular to a microstructure comprising a $\gamma$ phase and a $\gamma'$ phase, and a maximum content of topologically compact phases of 6%, in mole percent. The topologically compact phases comprise the $\mu$, P, R, and $\sigma$ phases, as well as the Laves phases. The microstructure may also comprise the following carbides: MC, $M_6C$, $M_7C_3$, and $M_{23}C_6$.

Furthermore, these mechanical properties of creep resistance at temperature are obtained thanks to a better stability of the microstructure between 650° C. and 1200° C.

Such a superalloy composition also improves the oxidation and corrosion resistance of parts made from said superalloy. The corrosion and oxidation resistance is achieved by providing a minimum of 9.5%, in atomic percent, aluminum in the γ phase at 1200° C., and a minimum of 7.5%, in atomic percent, chromium in the γ phase at 1200° C., thereby ensuring the formation of a protective layer of alumina on the surface of the material.

In addition, such a superalloy composition simplifies the manufacturing process of the part. Such simplification is ensured by obtaining a difference of at least 10° C. between the solvus temperature of the γ' precipitates and the solidus temperature of the superalloy, thus facilitating the implementation of a step of re-solution of the γ' precipitates during the manufacturing of the part.

In addition, such a superalloy composition allows for improved manufacturing by reducing the risk of defect formation during the manufacture of the part, and in particular the formation of "freckle"-type parasitic grains during directional solidification.

Indeed, the superalloy composition reduces the susceptibility of the part to the formation of "freckle" parasitic grains. The susceptibility of the part to the formation of "freckle" parasitic grains is evaluated using the criterion of Konter, denoted NFP, which is given by the following equation (1):

[Math. 1]

$$NFP = \frac{[\%\,Ta + 1.5\%\,Hf + 0.5\%\,Mo - 0.5\%\,Ti]}{[\%\,W + 1.2\%\,Re]} \quad (1)$$

Where % Ta is the tantalum content of the superalloy, in weight percent; where % Hf is the hafnium content of the superalloy, in weight percent; where % Mo is the molybdenum content of the superalloy, in weight percent; where % Ti is the titanium content in the superalloy, in weight percent; where % W is the tungsten content in the superalloy, in weight percent; and where % Re is the rhenium content in the superalloy, in weight percent.

The superalloy composition makes it possible to obtain an NFP parameter greater than or equal to 0.7, a value above which the formation of "freckle" parasitic grains is greatly reduced.

Furthermore, such a superalloy composition allows for a reduced density, in particular a density below 8.4 g/cm$^3$.

Table 1 below shows the composition, in weight percent, of seven examples of superalloys in accordance with the invention, Examples 1 to 11, as well as commercial or reference superalloys, Examples 12 to 16. Example 12 corresponds to the René®N5 superalloy, Example 13 corresponds to the CMSX-4® superalloy, Example 14 corresponds to the CMSX-4 Plus® Mod C superalloy, Example 15 corresponds to the René®N6 superalloy, and Example 16 corresponds to the CMSX-10 K® superalloy.

TABLE 1

| Alloys | Ni | Al | Ta | Ti | Co | Cr | Mo | W | Re | Hf | Other |
|---|---|---|---|---|---|---|---|---|---|---|---|
| Ex 1 | Balance | 7 | 5 | 2 | 14 | 5 | 2 | 1 | 5 | 0 | |
| Ex 2 | Balance | 7 | 5 | 2 | 14 | 5 | 1 | 0 | 5 | 0 | |
| Ex 3 | Balance | 7 | 5 | 2 | 13 | 6 | 2 | 0 | 5 | 0 | |
| Ex 4 | Balance | 7 | 5 | 2 | 14 | 6 | 2 | 0 | 5 | 0 | |
| Ex 5 | Balance | 7 | 5 | 2 | 13 | 7 | 1 | 0 | 5 | 0 | |
| Ex 6 | Balance | 7 | 5 | 2 | 14 | 6 | 2 | 0 | 4 | 0 | |
| Ex 7 | Balance | 7 | 5 | 2 | 14 | 6 | 3 | 0 | 4 | 0 | |
| Ex 8 | Balance | 7 | 5 | 2 | 14 | 5 | 2 | 1 | 5 | 0.1 | |
| Ex 9 | Balance | 7 | 5 | 2 | 14 | 5 | 2 | 1 | 5 | 0.15 | |
| Ex 10 | Balance | 7 | 5 | 2 | 14 | 5 | 2 | 1 | 5 | 0 | Si 0.1 |
| Ex 11 | Balance | 7 | 5 | 2 | 14 | 5 | 2 | 1 | 5 | 0.4 | Si 0.1 |
| Ex 12 | Balance | 6.2 | 6 | 0 | 8 | 7 | 2 | 5 | 3 | 0.15 | 0.05 C + 0.004 B + 0.01 Y |
| Ex 13 | Balance | 5.6 | 6.5 | 1 | 9 | 6.5 | 0.6 | 6 | 3 | 0.1 | |
| Ex 14 | Balance | 5.7 | 8 | 0.85 | 10 | 3.5 | 0.6 | 6 | 4.8 | 0.1 | |
| Ex 15 | Balance | 6 | 7.5 | 0 | 12.2 | 4.4 | 1.1 | 5.7 | 5.3 | 0.15 | 0.05 C + 0.004 B + 0.01 Y |
| Ex 16 | Balance | 5.7 | 8 | 0.2 | 3 | 2 | 0.4 | 5 | 6 | 0.03 | 0.1 Nb + 0.01 Si |

Table 2 gives estimated characteristics of the superalloys listed in Table 1. The characteristics given in Table 2 are density, Konter's criterion (NFP), as well as creep rupture stress at 950° C. in 1100 h, creep rupture stress at 1050° C. in 550 h, and creep rupture stress at 1200° C. in 510 h, the creep rupture stresses are named CRF in Table 2.

TABLE 2

| Alloys | Density | NFP | CRF 950° C./ 1100 h (MPa) | CRF 1050° C./ 550 h (MPa) | CRF 1200° C./ 510 h (MPa) |
|---|---|---|---|---|---|
| Ex 1 | 8.39 | 0.71 | 274 | 180 | 89 |
| Ex 2 | 8.35 | 0.75 | 285 | 182 | 96 |
| Ex 3 | 8.33 | 0.83 | 264 | 172 | 95 |
| Ex 4 | 8.33 | 0.83 | 279 | 180 | 98 |
| Fx 5 | 8.32 | 0.75 | 257 | 169 | 96 |
| Ex 6 | 8.29 | 1.04 | 267 | 170 | 93 |
| Ex 7 | 8.28 | 1.15 | 265 | 170 | 93 |
| Ex 8 | 8.40 | 0.74 | 270 | 177 | 87 |
| Ex 9 | 8.41 | 0.75 | 268 | 175 | 86 |
| Ex 10 | 8.40 | 0.71 | 274 | 180 | 89 |
| Ex 11 | 8.41 | 0.74 | 270 | 177 | 87 |
| Ex 12 | 8.58 | 0.85 | 222 | 136 | 73 |
| Ex 13 | 8.67 | 0.67 | 237 | 142 | 67 |
| Ex 14 | 8.90 | 0.68 | 265 | 150 | 56 |
| Ex 15 | 8.87 | 0.69 | 278 | 158 | 66 |
| Ex 16 | 8.98 | 0.67 | 285 | 160 | 58 |

Table 3 gives estimated characteristics of the superalloys listed in Table 1. The characteristics given in Table 3 are the different transformation temperatures (the solvus, the solidus and the liquidus), the mole fraction of the γ' phase at 900° C., at 1050° C. and at 1200° C., the mole fraction of the topologically compacted phases (TPC) at 900° C. and at 1050° C.

TABLE 3

| | Transformation temperatures (° C.) | | | $\gamma'$ phase mole fraction (% mol) | | | TCP mole fraction (% mol) | |
|---|---|---|---|---|---|---|---|---|
| Alloys | Solvus | Solidus | Liquidus | 900° C. | 1050° C. | 1200° C. | 900° C. | 1050° C. |
| Ex 1 | 1281 | 1288 | 1376 | 81 | 70 | 40 | 3 | 0.4 |
| Ex 2 | 1280 | 1303 | 1387 | 78 | 67 | 38 | 3.7 | 0 |
| Ex 3 | 1280 | 1287 | 1373 | 80 | 68 | 39 | 4.8 | 0.1 |
| Ex 4 | 1274 | 1286 | 1374 | 80 | 67 | 37 | 4.7 | 0 |
| Ex 5 | 1275 | 1288 | 1374 | 77 | 65 | 35 | 4.3 | 0 |
| Ex 6 | 1271 | 1291 | 1374 | 79 | 67 | 35 | 3.0 | 0 |
| Ex 7 | 1271 | 1283 | 1367 | 82 | 68 | 36 | 5.3 | 0.2 |
| Ex 8 | 1283 | 1280 | 1375 | 82 | 71 | 42 | 4.0 | 0.1 |
| Ex 9 | 1282 | 1277 | 1375 | 82 | 71 | 42 | 4.0 | 0.2 |
| Ex 10 | 1281 | 1285 | 1374 | 81 | 70 | 41 | 4.4 | 0.6 |
| Ex 11 | 1281 | 1277 | 1373 | 82 | 71 | 41 | 4.5 | 0.7 |
| Ex 12 | 1305 | 1335 | 1392 | 47 | 47 | 29 | 0 | 0 |
| Ex 13 | 1269 | 1311 | 1385 | 45 | 45 | 23 | 0 | 0 |
| Ex 14 | 1307 | 1320 | 1398 | 53 | 52 | 34 | 0.4 | 0.5 |
| Ex 15 | 1284 | 1336 | 1400 | 44 | 44 | 24 | 0.03 | 0.03 |
| Ex 16 | 1371 | 1382 | 1400 | 58 | 58 | 46 | 0.01 | 0.13 |

As illustrated in Table 3, for the superalloys of Examples 1 to 11, the mole fractions of $\gamma'$ phase are high at 1200° C. (between 35% and 40% in mole percent), reflecting high stability of the hardening precipitates, thus improving the mechanical properties at high temperatures. In addition, the mole fraction of topologically compact phases for the superalloys of Examples 1 to 11 is low at 900° C. (≈5%) and negligible at 1050° C. (<0.5%), also reflecting a high stability of the microstructure, thus improving the mechanical properties at high temperatures.

Table 4 gives estimated characteristics of the superalloys listed in Table 1. The characteristics given in Table 4 are the activity of chromium in they phase at 900° C., and the activity of aluminum in they phase at 1100° C. The activities of chromium and aluminum in the $\gamma$ matrix are an indication of the corrosion and oxidation resistance, the higher the chromium activity and aluminum activity in the matrix, the higher the corrosion and oxidation resistance.

TABLE 4

| Alloys | $\gamma$ phase Cr activity 900° C. | $\gamma$ phase Al activity 1100° C. |
|---|---|---|
| Ex 1 | 2.6E−3 | 1.94E−07 |
| Ex 2 | 2.4E−3 | 1.60E−07 |
| Ex 3 | 3.0E−3 | 1.96E−07 |
| Ex 4 | 2.9E−3 | 2.06E−07 |
| Ex 5 | 3.4E−3 | 2.10E−07 |
| Ex 6 | 3.0E−3 | 1.89E−07 |
| Ex 7 | 3.1E−3 | 2.07E−07 |
| Ex 8 | 2.6E−3 | 1.95E−07 |
| Ex 9 | 2.6E−3 | 1.96E−07 |
| Ex 10 | 2.6E−3 | 2.05−07 |
| Ex 11 | 2.6E−3 | 2.07−07 |
| Ex 12 | 3.10E−3 | 1.29E−07 |
| Ex 13 | 3.02E−3 | 1.27E−07 |
| Ex 14 | 1.50E−3 | 1.0.2E−07 |
| Ex 15 | 1.79E−3 | 1.47E−07 |
| Ex 16 | 5.21E−4 | 4.23E−08 |

As illustrated in Tables 2, 3 and 4, the superalloys in accordance with the invention possess superior mechanical properties at high temperatures to the alloys of the prior art, while exhibiting lower density and superior corrosion and oxidation resistance.

The properties given in Tables 3 and 4 are estimated using the CALPHAD (CALculation of PHAse Diagrams) method.

The nickel-based superalloy part can be made by casting.

The casting of the part is made by melting the superalloy, the liquid superalloy being poured into a mold to be cooled and solidified. The casting of the part can for example be made by the lost wax technique, in particular to make a blade.

Furthermore, in order to produce a single-crystal part, in particular a blade, the process can comprise a directional solidification step. The directional solidification is performed by controlling the thermal gradient and the solidification rate of the superalloy, and by introducing a single-crystal grain or by using a grain selector, in order to avoid the appearance of new grains in front of the solidification front.

In particular, directional solidification can allow the manufacture of a single-crystal blade whose crystal structure is oriented along a crystallographic direction <001> that is parallel to the longitudinal direction of the blade, i.e., along the radial direction of the turbomachine, such an orientation offering better mechanical properties.

The invention claimed is:

1. A nickel-based superalloy comprising, in weight percent, 6 to 8% aluminum, 12 to 15% cobalt, 4 to 8% chromium, 0 to 0.2% hafnium, 0.5 to 4% molybdenum, 3.5 to 6% rhenium, 4.5 to 5.5% tantalum, 1.5 to 2.5% titanium, 0 to 2% tungsten, 0 to 0.1% silicon, the balance consisting of nickel and unavoidable impurities, wherein a ratio NFP defined by equation (1) is greater than or equal to 0.71:

$$NFP = \frac{[\%\ \mathrm{Ta} + 1,\ 5\%\ \mathrm{Hf} + 0,\ 5\%\ \mathrm{Mo} - 0,\ 5\%\ \mathrm{Ti}]}{[\%\ W + 1,\ 2\%\ \mathrm{Re}]}. \qquad (1)$$

2. The superalloy as claimed in claim 1, wherein said superalloy comprises, in weight percent, 6 to 8% aluminum, 12 to 15% cobalt, 4 to 8% chromium, 0 to 0.2% hafnium, 0.5 to 4% molybdenum, 3.5 to 6% rhenium, 4.5 to 5.5% tantalum, 1.5 to 2.5% titanium, 0 to 2% tungsten, 0 to 0.05% silicon, the balance consisting of nickel and unavoidable impurities.

3. The superalloy as claimed in claim 1, wherein said superalloy comprises, in weight percent, 6 to 8% aluminum, 12 to 15% cobalt, 4 to 8% chromium, 0 to 0.15% hafnium, 0.5 to 4% molybdenum, 3.5 to 6% rhenium, 4.5 to 5.5% tantalum, 1.5 to 2.5% titanium, 0 to 2% tungsten, 0 to 0.1% silicon, the balance consisting of nickel and unavoidable impurities.

4. The superalloy as claimed in claim 1, wherein said superalloy comprises, in weight percent, 6.5 to 7.5% aluminum, 12 to 15% cobalt, 4.5 to 7.5% chromium, 0 to 0.2% hafnium, 0.5 to 3.5% molybdenum, 3.5 to 5.5% rhenium, 4.5 to 5.5% tantalum, 1.5 to 2.5% titanium, 0 to 1.5% tungsten, 0 to 0.1% silicon, the balance consisting of nickel and unavoidable impurities.

5. The superalloy as claimed in claim 4, wherein said superalloy comprises, in weight percent, 6.5 to 7.5% aluminum, 13 to 15% cobalt, 4.5 to 5.5% chromium, 0 to 0.2% hafnium, 1.5 to 2.5% molybdenum, 4.5 to 5.5% rhenium, 4.5 to 5.5% tantalum, 1.5 to 2.5% titanium, 0.5 to 1.5% tungsten, the balance consisting of nickel and unavoidable impurities.

6. The superalloy as claimed in claim 4, wherein said superalloy comprises, in weight percent, 6.5 to 7.5% aluminum, 13 to 15% cobalt, 4.5 to 5.5% chromium, 0 to 0.2% hafnium, 0.5 to 1.5% molybdenum, 4.5 to 5.5% rhenium, 4.5 to 5.5% tantalum, 1.5 to 2.5% titanium, the balance consisting of nickel and unavoidable impurities.

7. The superalloy as claimed in claim 4, wherein said superalloy comprises, in weight percent, 6.5 to 7.5% aluminum, 12 to 14% cobalt, 5.5 to 6.5% chromium, 0 to 0.2% hafnium, 1.5 to 2.5% molybdenum, 4.5 to 5.5% rhenium, 4.5 to 5.5% tantalum, 1.5 to 2.5% titanium, the balance consisting of nickel and unavoidable impurities.

8. The superalloy as claimed in claim 4, wherein said superalloy comprises, in weight percent, 6.5 to 7.5% aluminum, 13 to 15% cobalt, 5.5 to 6.5% chromium, 0 to 0.2% hafnium, 1.5 to 2.5% molybdenum, 4.5 to 5.5% rhenium, 4.5 to 5.5% tantalum, 1.5 to 2.5% titanium, the balance consisting of nickel and unavoidable impurities.

9. The superalloy as claimed in claim 4, wherein said superalloy comprises, in weight percent, 6.5 to 7.5% aluminum, 12 to 14% cobalt, 6.5 to 7.5% chromium, 0 to 0.2% hafnium, 0.5 to 1.5% molybdenum, 4.5 to 5.5% rhenium, 4.5 to 5.5% tantalum, 1.5 to 2.5% titanium, the balance consisting of nickel and unavoidable impurities.

10. The superalloy as claimed in claim 4, wherein said superalloy comprises, in weight percent, 6.5 to 7.5% aluminum, 13 to 15% cobalt, 6.5 to 7.5% chromium, 0 to 0.2% hafnium, 1.5 to 2.5% molybdenum, 3.5 to 4.5% rhenium, 4.5 to 5.5% tantalum, 1.5 to 2.5% titanium, the balance consisting of nickel and unavoidable impurities.

11. The superalloy as claimed in claim 4, wherein said superalloy comprises, in weight percent, 6.5 to 7.5% aluminum, 13 to 15% cobalt, 5.5 to 6.5% chromium, 0 to 0.2% hafnium, 2.5 to 3.5% molybdenum, 3.5 to 4.5% rhenium, 4.5 to 5.5% tantalum, 1.5 to 2.5% titanium, the balance consisting of nickel and unavoidable impurities.

12. A nickel-based superalloy turbomachinery part as claimed in claim 1.

13. The part as claimed in claim 12, wherein said part is single-crystal.

14. The superalloy as claimed in claim 1, having a density of less than or equal to 8.4 $g/cm^3$.

* * * * *